June 6, 1939. B. M. BIRD ET AL 2,161,500
PROCESS AND APPARATUS FOR TREATMENT OF MINERAL MATERIALS
Original Filed Jan. 2, 1935  15 Sheets-Sheet 2
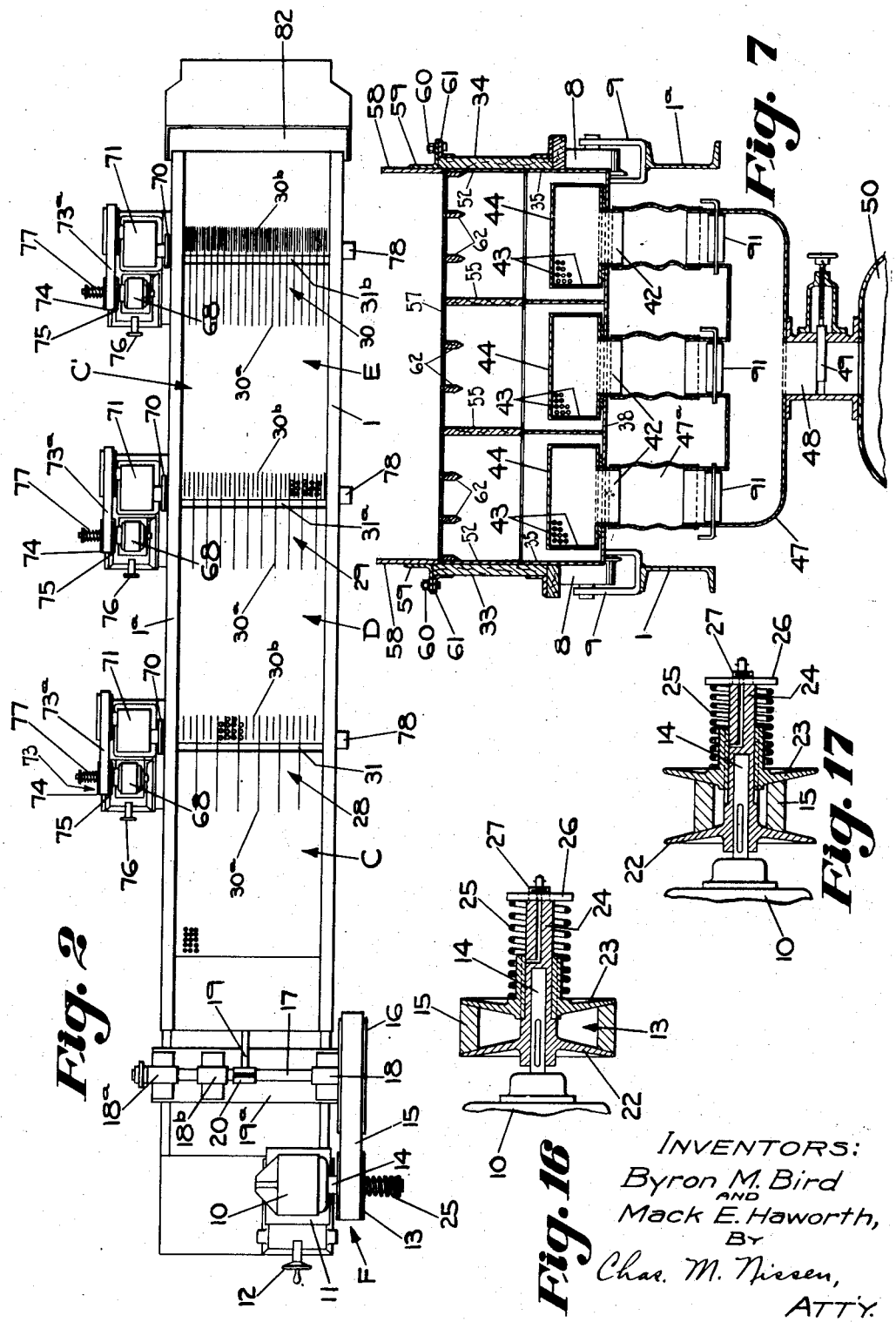
INVENTORS:
Byron M. Bird
AND
Mack E. Haworth,
BY
Chas. M. Nissen,
ATTY.

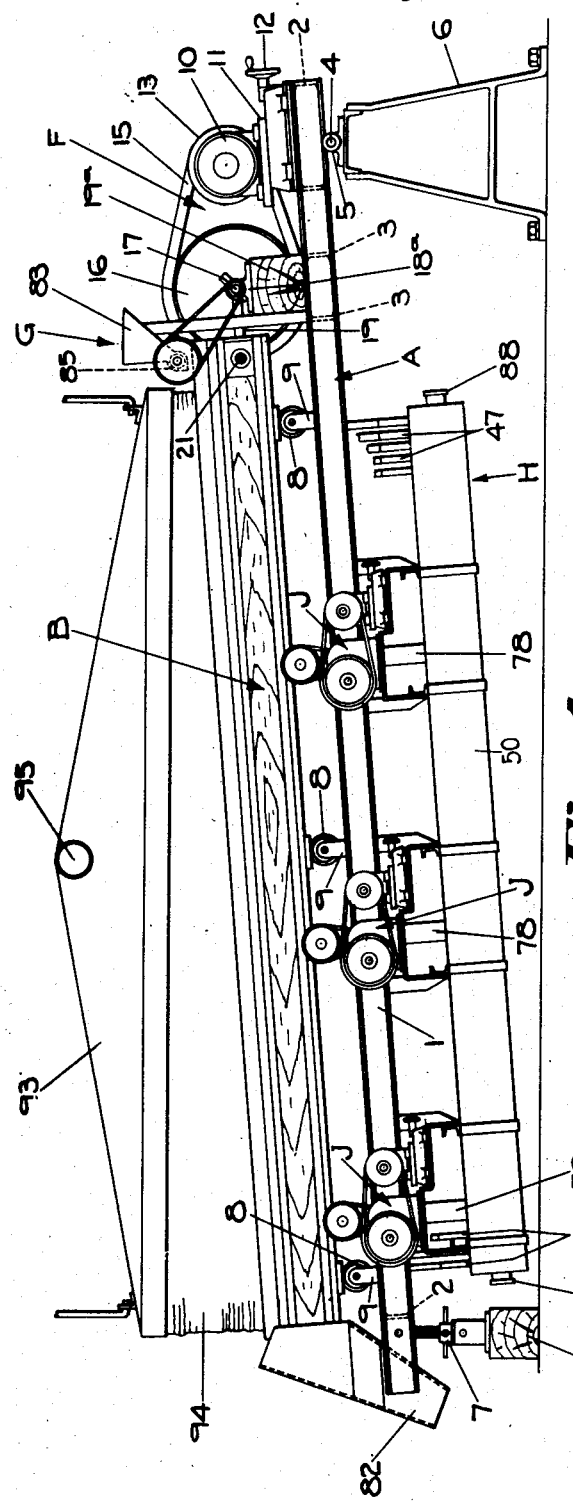

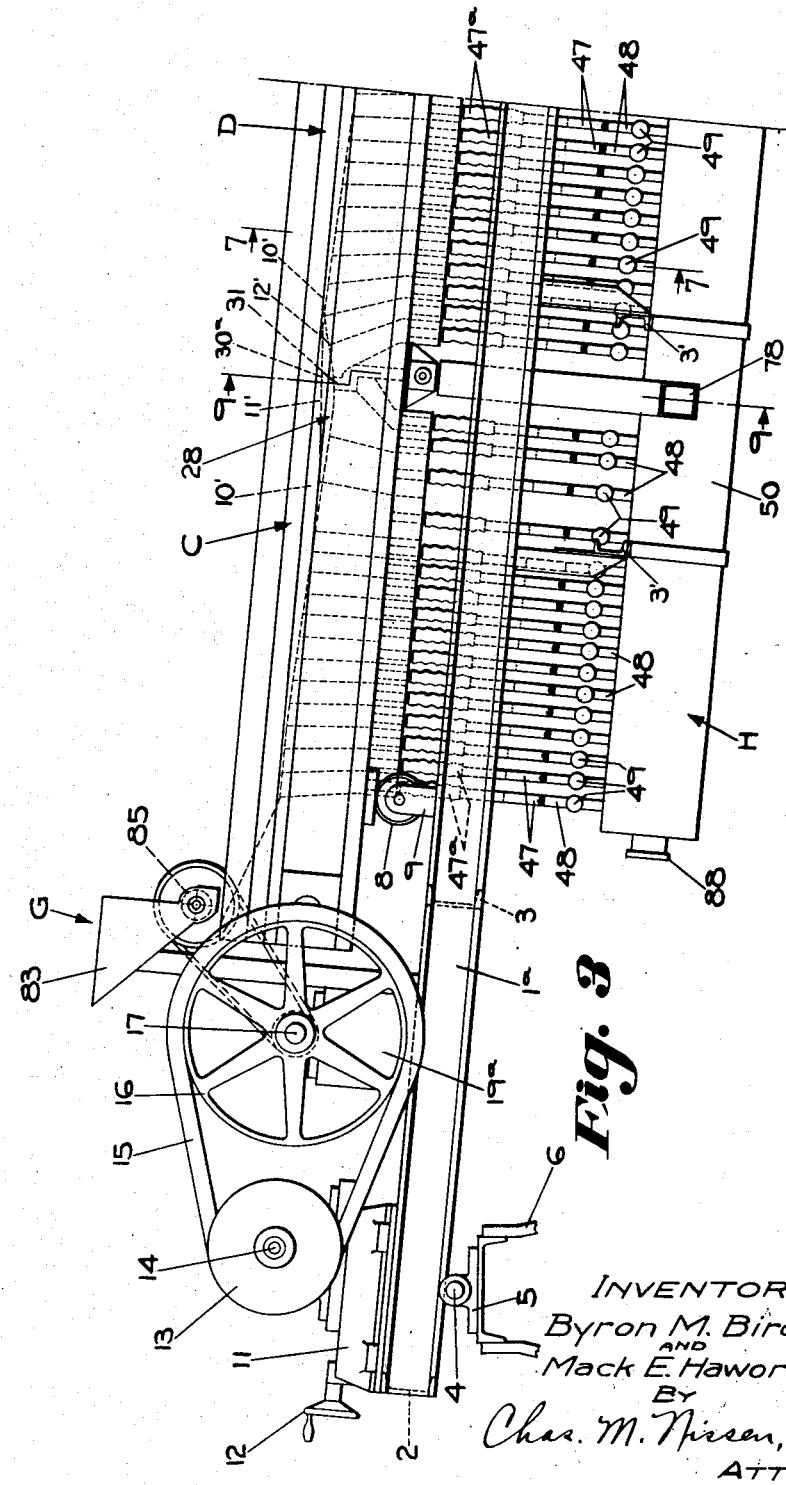

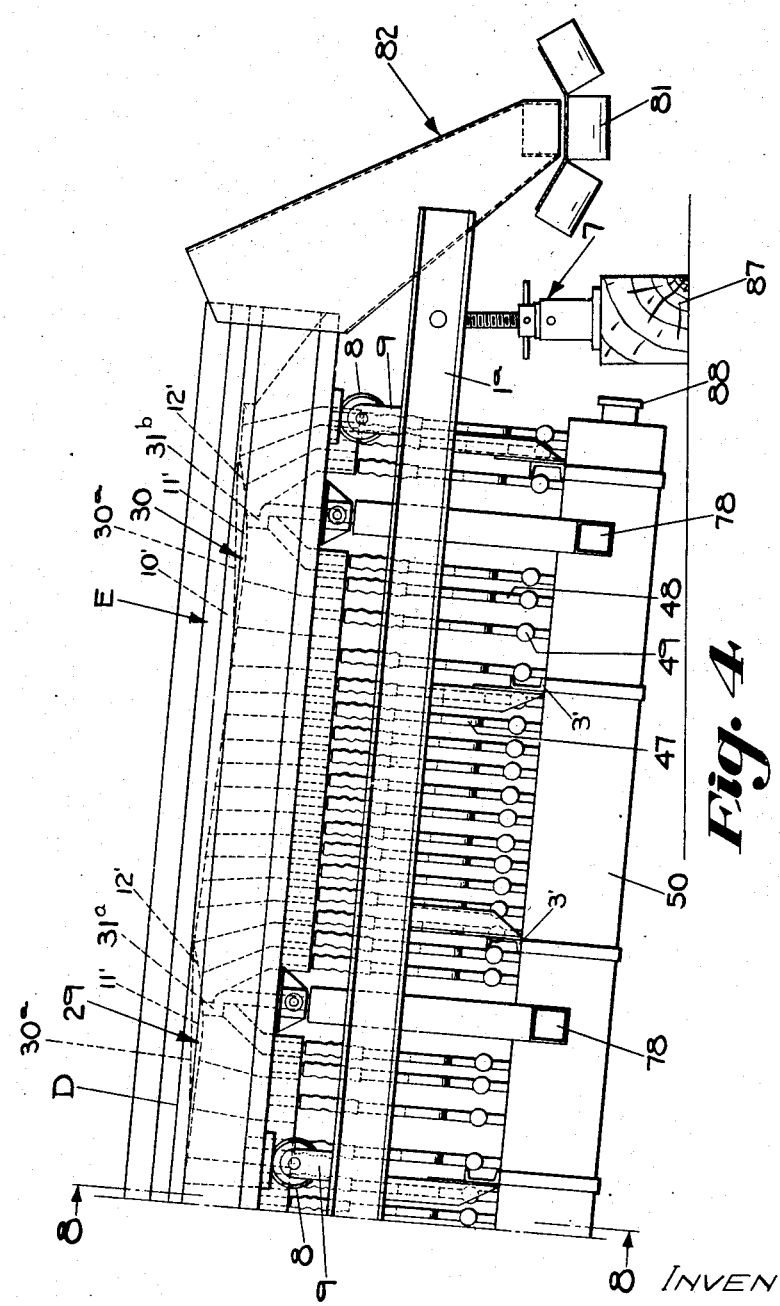

June 6, 1939.  B. M. BIRD ET AL  2,161,500
PROCESS AND APPARATUS FOR TREATMENT OF MINERAL MATERIALS
Original Filed Jan. 2, 1935  15 Sheets-Sheet 5
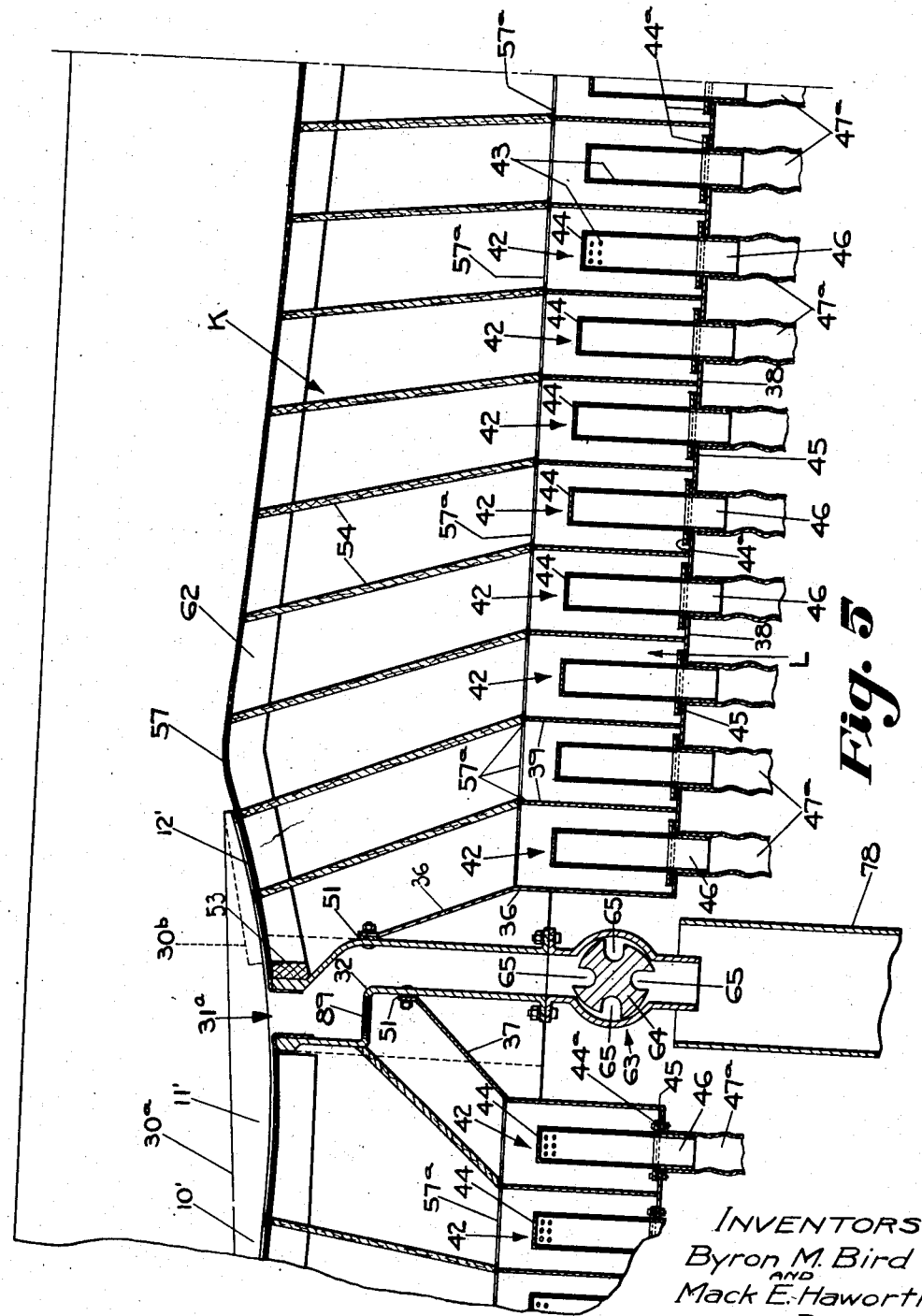
INVENTORS:
Byron M. Bird
AND
Mack E. Haworth,
BY
Chas. M. Nissen,
ATT'Y.

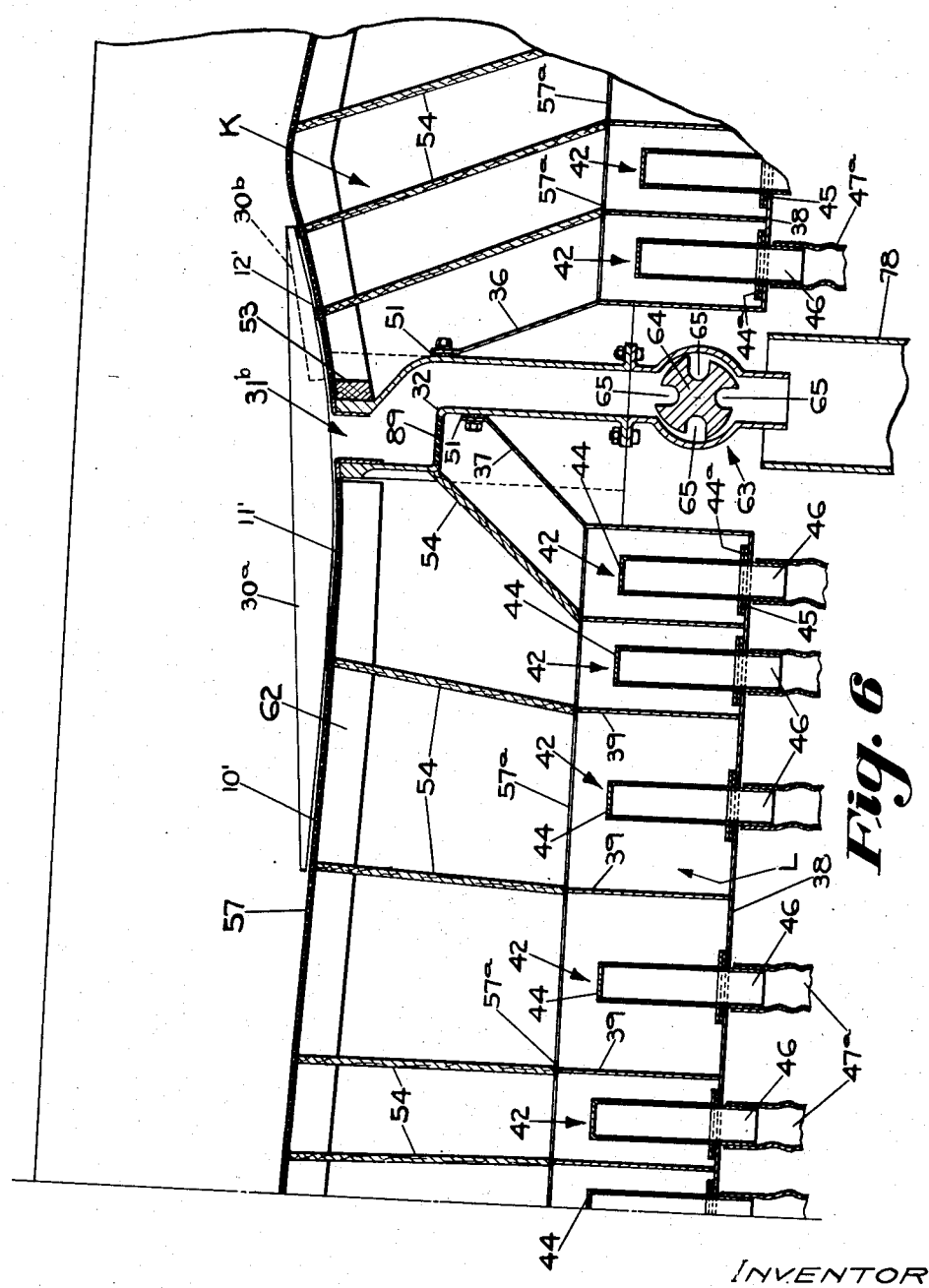

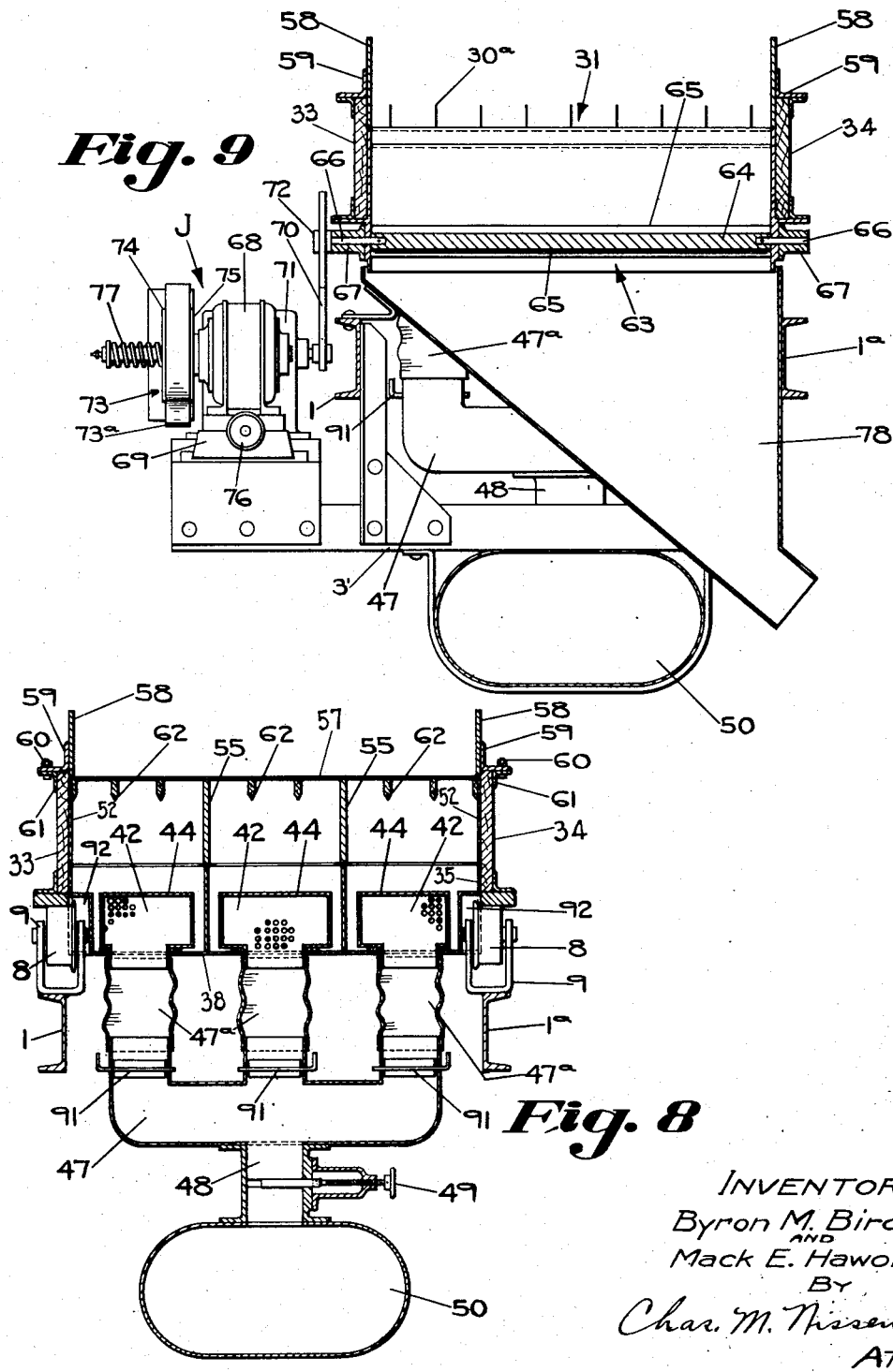

June 6, 1939. B. M. BIRD ET AL 2,161,500
PROCESS AND APPARATUS FOR TREATMENT OF MINERAL MATERIALS
Original Filed Jan. 2, 1935 15 Sheets-Sheet 8
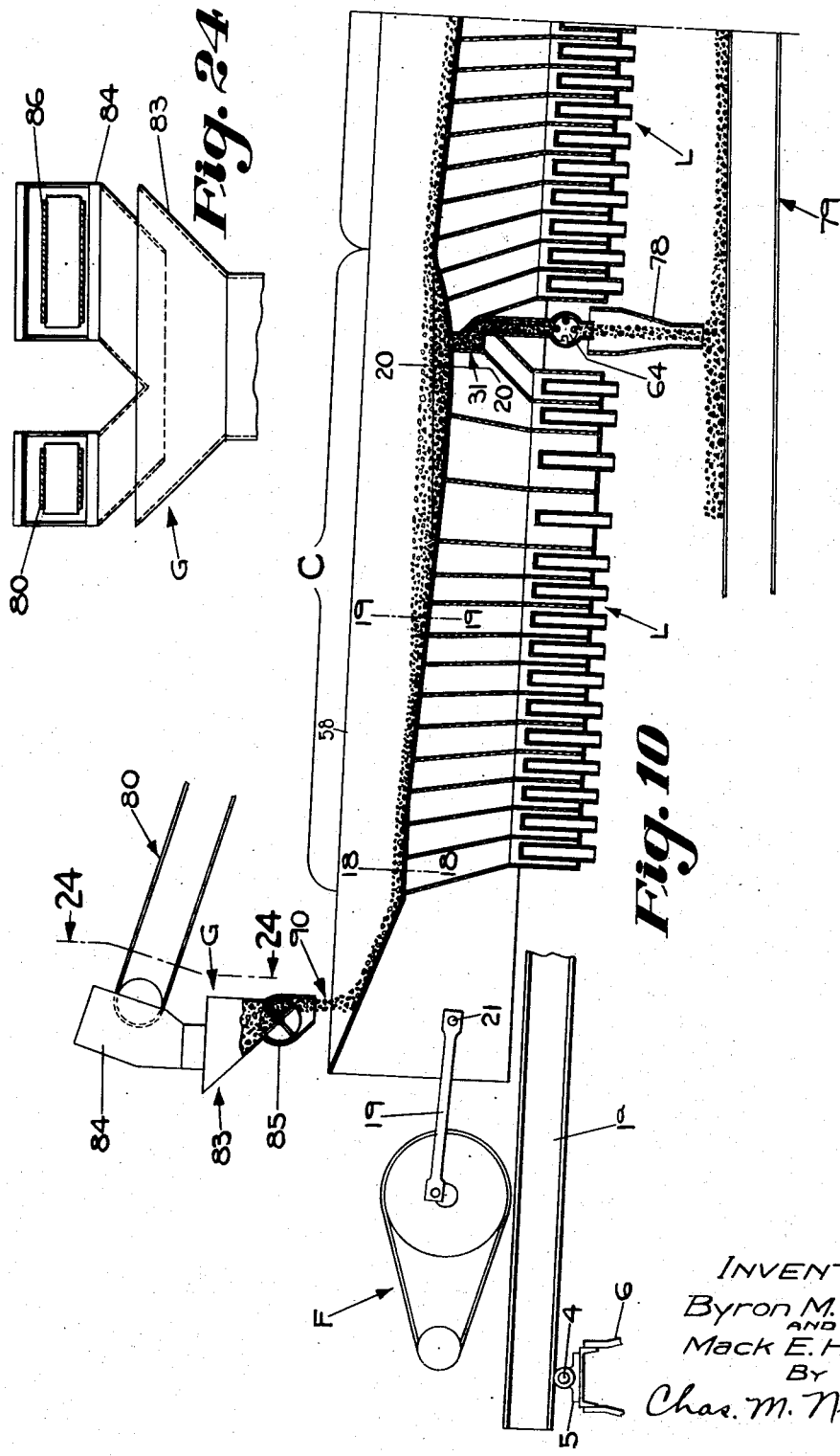
INVENTORS:
Byron M. Bird
AND
Mack E. Haworth,
By
Chas. M. Nissen,
ATT'Y.

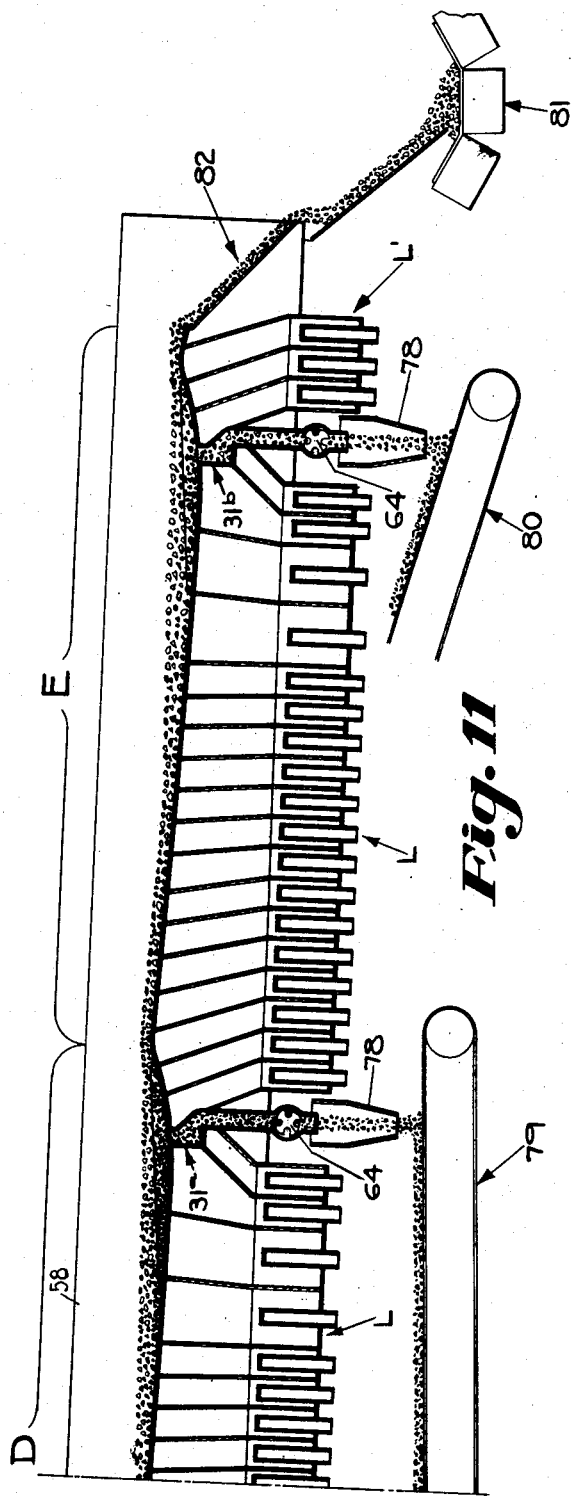

June 6, 1939.  B. M. BIRD ET AL  2,161,500
PROCESS AND APPARATUS FOR TREATMENT OF MINERAL MATERIALS
Original Filed Jan. 2, 1935   15 Sheets-Sheet 10
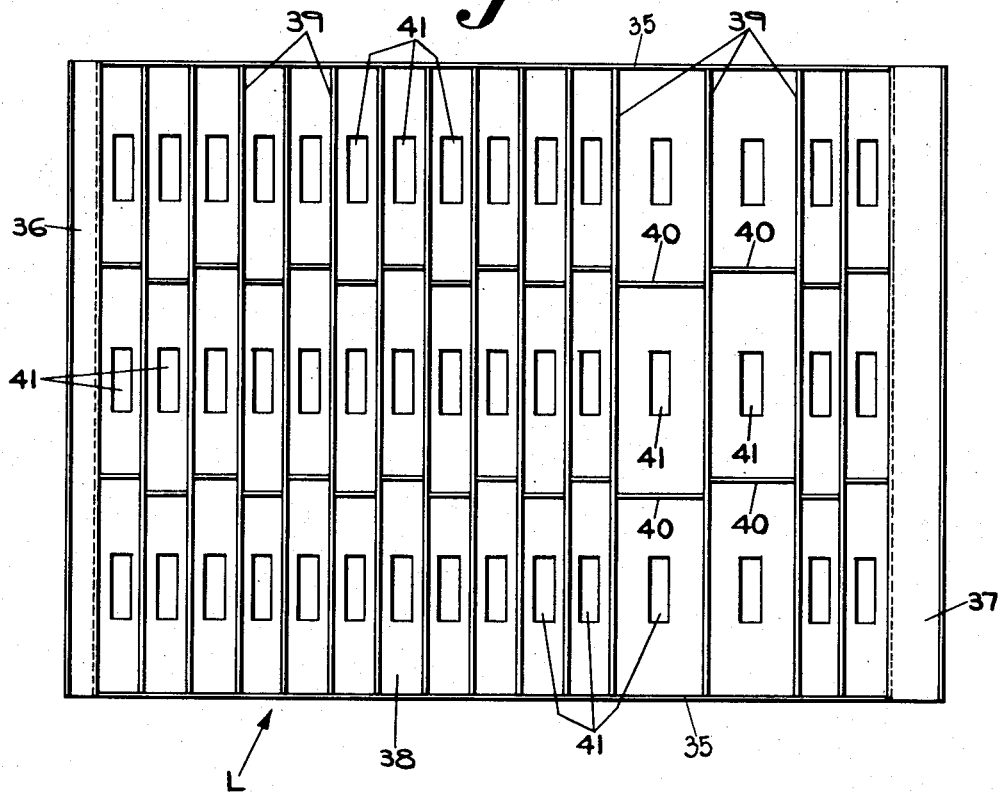
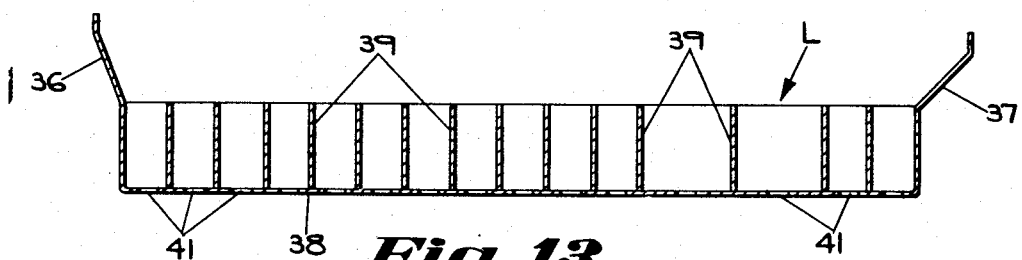
INVENTORS:
Byron M. Bird
AND
Mack E. Haworth,
BY
Chas. M. Nissen,
ATT'Y.

June 6, 1939.　　　B. M. BIRD ET AL　　　2,161,500
PROCESS AND APPARATUS FOR TREATMENT OF MINERAL MATERIALS Original Filed Jan. 2, 1935　　15 Sheets-Sheet 11

INVENTORS:
Byron M. Bird
AND
Mack E. Haworth,
BY
Chas. M. Nissen,
ATTY.

June 6, 1939.  B. M. BIRD ET AL  2,161,500

PROCESS AND APPARATUS FOR TREATMENT OF MINERAL MATERIALS

Original Filed Jan. 2, 1935   15 Sheets-Sheet 12

■ HIGH GRAVITY PARTICLES.
▨ INTERMEDIATE GRAVITY PARTICLES.
▱ LOW GRAVITY PARTICLES.

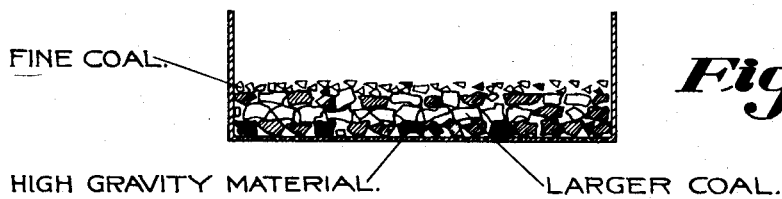

FINE COAL.

*Fig. 18*

HIGH GRAVITY MATERIAL.   LARGER COAL.

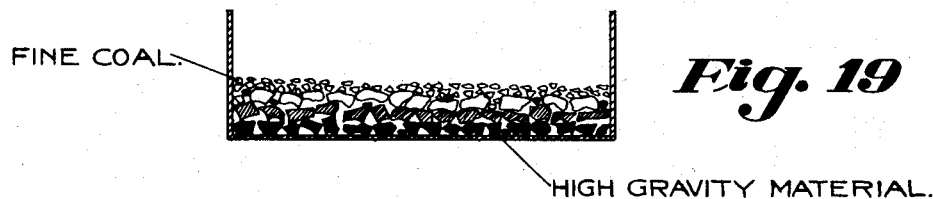

FINE COAL.

*Fig. 19*

HIGH GRAVITY MATERIAL.

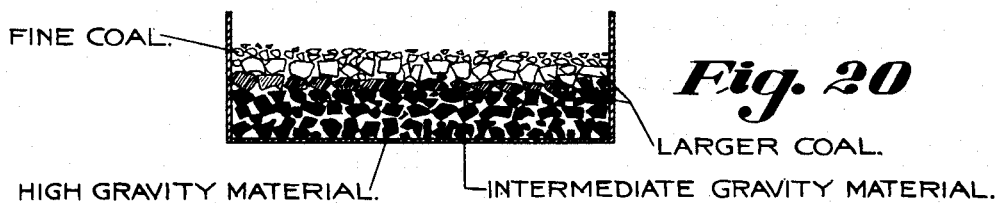

FINE COAL.

*Fig. 20*

LARGER COAL.

HIGH GRAVITY MATERIAL.   INTERMEDIATE GRAVITY MATERIAL.

INVENTORS:
Byron M. Bird
AND
Mack E. Haworth,
BY
Chas. M. Nissen,
ATTY.

Curves A-B - "Free Settling"
Curves C-D - "Hindered Settling"
Curves E-F - "Super Hindered Settling"

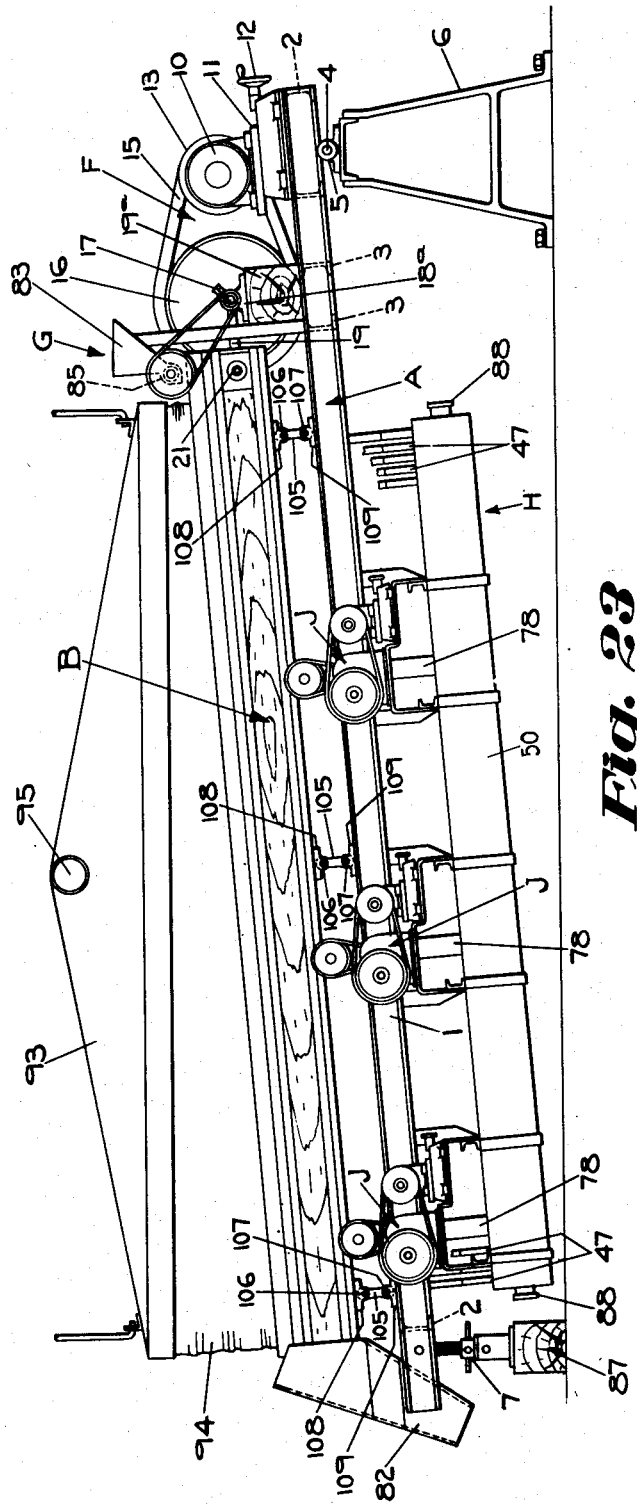

Patented June 6, 1939

2,161,500

UNITED STATES PATENT OFFICE 2,161,500

PROCESS AND APPARATUS FOR TREATMENT OF MINERAL MATERIALS

Byron M. Bird, Columbus, and Mack E. Haworth, Arlington, Ohio, assignors to The Jeffrey Manufacturing Company, a corporation of Ohio Application January 2, 1935, Serial No. 66
Renewed October 13, 1937

5 Claims. (Cl. 209—466)

In ore and coal dressing and analogous operations, it is frequently desirable to subject the material to a process of concentration for the purpose of separating materials of various characteristics, one from the other.

The present invention relates to a new and improved process of and apparatus for treating materials composed of mixtures of particles of different sizes, and of different specific gravities which may or may not be of relatively wide range, whereby a concentration or separation of desired components substantially free from undesired components is obtained.

One of the objects of the present invention is to effect a complete concentration or separation of component parts of a mass of material of relatively wide size range in accordance with the specific gravities of the various component parts, irrespective of size.

A further object of the invention is to coordinate, properly, the fundamental principles underlying the various conditions by which mobility in a bed of material may be produced, so that conditions herein termed "super-hindered settling" are prevalent.

A still further object of the invention is to effect concentration of the various fractions of materials found in a raw mined product, in a single step or a series of steps, comprising stratification, isolation of a portion of the materials stratified in the lower strata, and removal of the concentrates in a continuous operation.

A more specific object of the invention is to combine the effects of mechanical agitation of a bed of raw materials undergoing treatment, the flow of air upwardly through said bed, and the removal of certain fractions of the stratified material, in a continuous operation, to separate and classify the fractions of the raw material in a very efficient manner.

A still further object of the invention is to provide an apparatus the design of which is in accordance with the underlying fundamental principles affecting "super-hindered settling" laws, the stratification of the bed, and the removal of the products of concentration.

Other objects of the invention will become apparent as the description proceeds, the invention being exemplified in the discussion and illustrations hereinafter set forth in detail, and in the combination and arrangement of parts shown in the accompanying drawings, and described in the following specification, the features of novelty of the invention being more particularly pointed out in the appended claims.

The present invention is based upon the observed behavior of a bed of materials made up of components of particles of different sizes and different specific gravities, when subjected to combined mechanical agitation and upwardly directed fluid currents.

Observance of the bed of materials made up of components of the character indicated above will demonstrate that modification of air flow (volume and/or velocities) or mechanical agitation or the elimination of either varies the results obtained.

In considering the probable phenomena which take place in the operation of our device and in the practice of the process or method of our invention, observations indicate the following explanation of the action involved to be tenable, but it is to be understood that our method is not restricted by any particular theory of operation for, regardless of the exact action which takes place, practice has demonstrated the extremely desirable capabilities and high efficiency of said method and apparatus.

If a bed of materials is formed on a perforate screen, said bed containing particles of a relatively large size range and a relative large range of specific gravities, and a fluid, such as air, is forced upwardly through said bed at a substantially constant velocity, without mechanical agitation, the fluid velocity may be maintained sufficiently to maintain all of the particles in very fluid suspension. When this condition obtains and the largest particles of highest specific gravity are held completely in suspension, the bed for practical purposes may be said to typify a condition of "free-settling". Curves A—B of Fig. 21 are illustrative of interstitial air velocities capable of producing "free-settling" conditions for different size particles of different specific gravities.

If this velocity is gradually reduced, a velocity will be reached at which the largest particles of highest gravity will just rest on the screen. This reduced fluid velocity gives a condition which is called "hindered-settling". This condition is obtained with the interstitial velocities illustrated by curve C—D of Fig. 21 and represents a condition in which the lowest possible air velocities are employed to maintain substantially the whole bed mobile without mechanical agitation.

In the conditions of both "free-settling" and "hindered-settling", excluding mechanical agitation from consideration, there is a tendency for all particles which are in mobility to assume positions in strata according to both size and specific gravity. That is, particles will tend to stratify according to size with the largest particles adjacent the screen and with the size of the particles decreasing upwardly. Likewise, there will be a tendency for the particles to stratify in accordance with specific gravities, with the highest gravity materials adjacent the screen and the lower gravity materials forming in strata decreasing upwardly. When mixed sizes and specific gravities are in a condition of "free-settling", the largest particles of highest gravity material will be in the bottom stratum and the smallest particles of lowest gravity material will be in the upper stratum with mixtures of materials of different gravities and different sizes in all of the intermediate strata such that at any given level in the bed the particles of high specific gravity are smaller than those of low specific gravity. It is thus evident that with a bed of any appreciable size and gravity range, stratification in accordance with specific gravity is impossible with continuous upward currents of air alone.

It is evident that the fluid velocity may be reduced below that required in "hindered-settling" conditions so that none of the particles of highest specific gravity, irrespective of size, is held in suspension by the upward fluid currents. This reduced fluid velocity is employed in the method of our invention and is one requisite of the phenomena involved in "super-hindered-settling" as hereinafter more completely described. The interstitial air velocities employed in a typical case may be represented by curves E—F of Fig. 21.

The above discussion pertains to conditions without mechanical agitation and, as indicated, where the fluid velocity was reduced to the point employed for "super-hindered-settling", a portion of the particles were out of suspension. This condition alone would not be satisfactory for separation of materials according to specific gravity for it is evident that to effect separation, the entire bed of materials within which the separation or stratification is to take place must be mobile, so that the particles are free to seek their proper stratum according to their density.

To provide the necessary fluidity of this bed, where this lowered fluid velocity is employed, mechanical agitation may be employed. Mechanical agitation may then be relied upon to supply mobility to a bed otherwise immobile and in the practice of the method of our invention this mechanical agitation is sufficient to keep substantially the entire bed mobile throughout its length and throughout the entire area and depth thereof, except for a volume of accumulated refuse formed in a depression or pocket where said refuse is withdrawn and where there is formed a bed of substantially immobile refuse of the highest gravity material of practically all sizes within the range treated.

This mechanical agitation not only maintains most of the bed fluid or mobile, but it has another important function in the stratification of the material according to specific gravity.

It is known that if a bed of materials of different sizes and gravities, of any size range, is subjected to mechanical agitation without any fluid influences, the particles of a given specific gravity will tend to stratify according to size with the smallest particles on the bottom and the largest particles on the top, just the reverse of the tendency of said particles to stratify due to upward fluid currents. Mechanical agitation will also tend to stratify the particles according to specific gravities with the highest gravity particles on the bottom and the lowest gravity particles on the top. In this respect, the tendency is the same as that due to upward fluid currents. If mixed sizes and specific gravities are stratified, these two tendencies operate so that at any given level the particles of high specific gravity tend to be larger than those of low specific gravity. It is thus suggested that by taking advantage of both mechanical agitation and upward fluid flow, and properly combining the two, it is possible to stratify a bed according to densities or specific gravities over a large size range. The size range that can be treated depends principally upon the difference in the specific gravities of the materials to be separated and upon the gradation of sizes thereof. A relatively large difference in specific gravities, and/or a uniform gradation of sizes favors a large size range of materials in one treatment.

However, the mere co-ordination of the proper air velocity and mechanical agitation is not alone sufficient to produce an ultimate separation of coal and refuse. It is necessary to combine these two forces to a degree that will not only effect mobility of the bed but so that the interstitial velocities will preferably be just below those required to suspend the smallest particles of refuse, whereby said smallest particles of refuse may pass downward through the interstices to the lower strata of the bed. The above described conditions maintain during the longitudinal travel of the particles from a position where they are first subjected to treatment to a position where they are finally separated, along which path they are free to move and seek their positions as determined by the fluid flow and mechanical agitation, yet the combined effect of the mechanical agitation and fluid flow is so controlled that adjacent the end of travel of the particles an isolated bed of immobile refuse can form, across which the mobile bed extends, which immobile bed is formed of compact particles of the highest gravity particles of substantially all sizes within the treated range and is thus of such density that particles of lower or intermediate gravity material cannot penetrate said bed. This bed of immobile refuse preferably has a large surface, and extends rearwardly of the refuse withdrawal chute for an appreciable distance whereby vibrations imparted to the deck will be transmitted through said immobile bed as though it were a rigid part of the deck, and effect an efficient transfer of mechanical agitation to the mobile bed of material thereabove. Said immobile bed of refuse should also be maintained at substantially constant depth in any one pocket, after it is properly formed. This particular immobile bed formation will be discussed more in detail in connection with our method as carried out by the hereinafter described apparatus.

While these general principles are applicable to ore dressing generally, they are specifically applied in the present invention, for illustrative purposes, to the treatment of coal, for the purpose of obtaining a coal of desired ash content free from the impurities usually associated with coal. For efficient operation, these impurities must be removed with little or no coal losses in the refuse.

Other objects of the invention will appear hereinafter, the novel features and combinations being set forth in the appended claims.

An apparatus by means of which the present process may be carried out is illustrated in the accompanying drawings, in which:

Fig. 1 is a side elevation of the coal cleaning apparatus;

Fig. 2 is a plan view thereof;

Fig. 3 is a fragmentary side elevation of the apparatus of Fig. 1;

Fig. 4 is a continuation of Fig. 3, Figs. 3 and 4 having been split to accommodate the views to the respective sheets of drawing;

Fig. 5 is a fragmentary vertical section taken along the longitudinal axis of the apparatus shown in Fig. 2;

Fig. 6 is a continuation of Fig. 5, showing the remainder of the apparatus, Figs. 5 and 6 having been split to accommodate the views to the respective sheets of drawing;

Fig. 7 is a transverse section of the apparatus, taken on the line 7—7 of Fig. 3;

Fig. 8 is a transverse section of the apparatus on the line 8—8 of Fig. 4;

Fig. 9 is a transverse section through one of the refuse ejectors, the view being taken on the line 9—9 of Fig. 3;

Fig. 10 is a fragmentary longitudinal sectional view of the apparatus, illustrating diagrammatically the charging of material, such as coal onto the apparatus and the flow of the materials along the apparatus, together with the stratification of the materials of the bed and separation of the heaviest gravity components therefrom;

Fig. 11 is a continuation of Fig. 10, showing the continuation of the separation of the strata of the bed and final discharge of clean light gravity products from the apparatus;

Fig. 12 is a plan view of a preferred construction of a deck supporting member, illustrating certain details of the arrangement of the air distribution chambers;

Fig. 13 is an elevation of the structure shown in Fig. 12;

Fig. 16 is a sectional view of parts of the drive mechanism for obtaining variable drive speeds;

Fig. 17 is a view similar to Fig. 16, but showing the parts in somewhat different relative positions;

Figure 21:
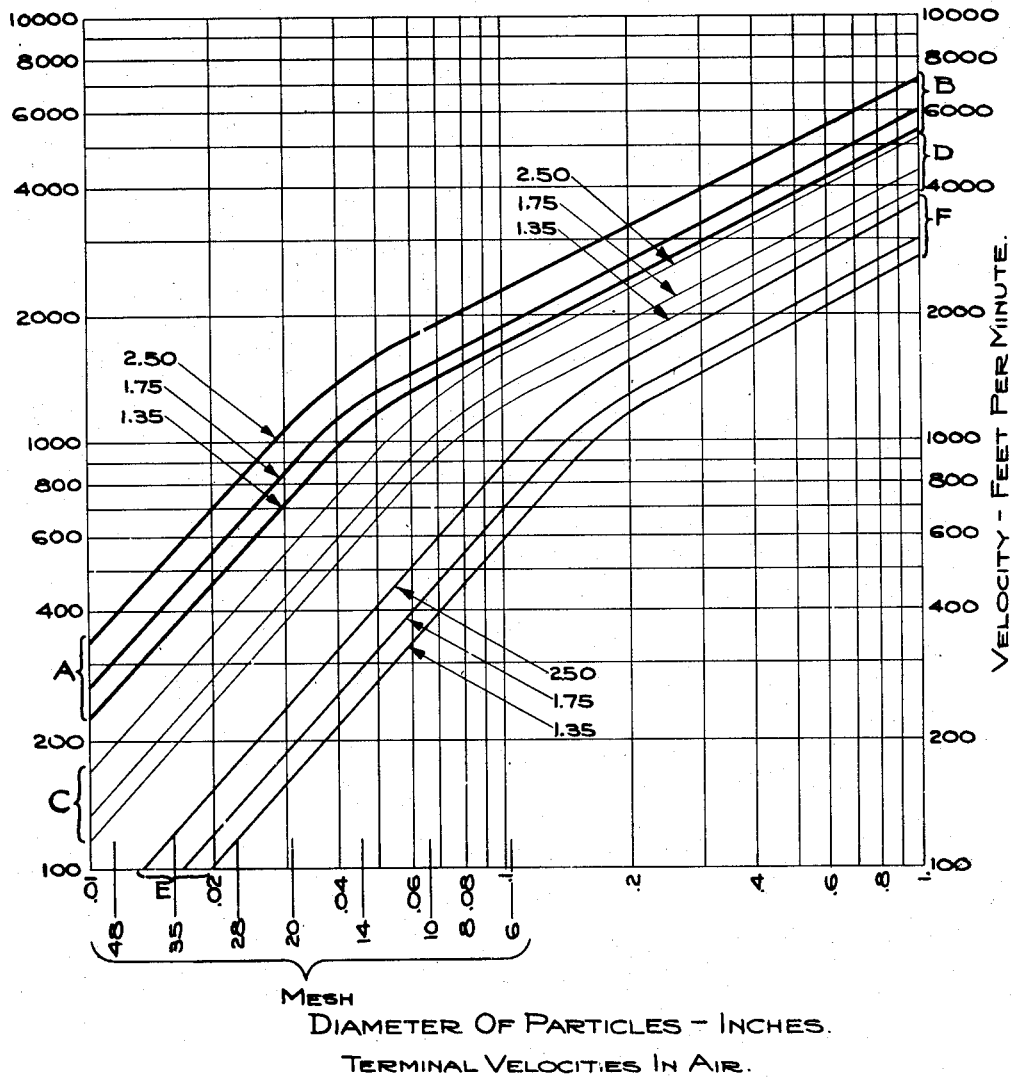
Figure 22:
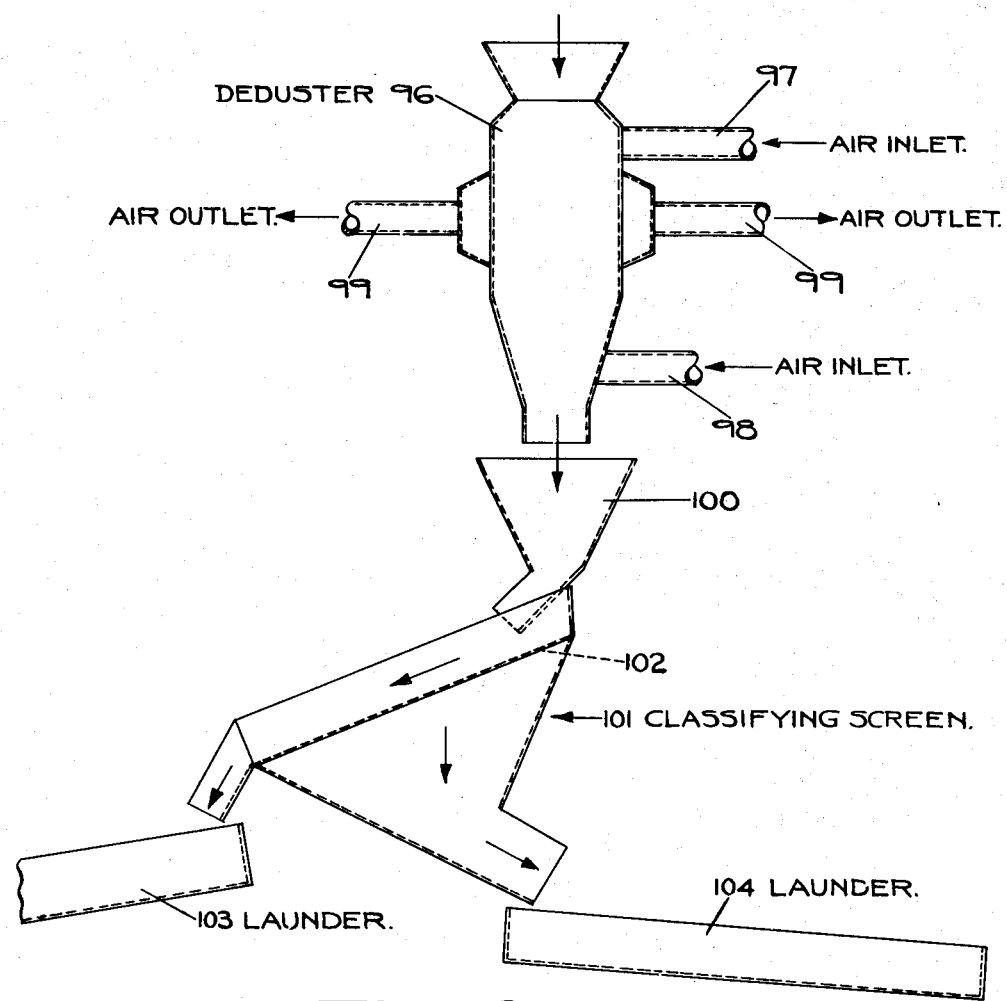

Figs. 18, 19 and 20 are vertical sections through the bed taken on the lines 18—18, 19—19 and 20—20 of Fig. 10, respectively, showing the increasing thickness of the bed and condition of stratification as the material moves to the first discharge chute;

Fig. 21 illustrates, by means of graphs, comparative interstitial air velocities that might be employed for given sizes of particles, with the velocities required to sustain those particles in a condition of "free-settling", a condition of "hindered-settling", or a condition of "super-hindered-settling", depending on the desired gravity separation;

Fig. 22 illustrates a diagrammatic flow sheet of the complete process;

Fig. 23 is a side elevation, similar to Fig. 1, showing the table oscillatable on rocker arms instead of the rollers of Fig. 1; and Fig. 24 is a section through the feed mechanism taken on line 24—24 of Fig. 10.

Referring more particularly to the drawings, it will be noted that in the illustrated form of apparatus, a main frame A supports a table or launder B comprising a plurality of sections C, D and E, each of which is provided with a pervious upper surface C and refuse draw outlets 31, 31a and 31b, respectively. The frame and launder B as illustrated slope downwardly from the feed end to the discharge end so that the materials being treated flow along the launder at a rate of travel dependent upon the degree of mobility produced and the slope or inclination of the launder. Side walls extending along each side of the pervious deck surface confine the material to a straight flow, there being no change in general direction of flow except where the separation of refuse takes place.

A drive mechanism generally indicated at F is provided for reciprocating the launder B in a plane parallel to the main frame A, the frequency and length of the strokes being such that the proper degree of mobility will be produced in a bed of material fed to the launder from feeding mechanism G due to mechanical agitation in cooperation with the aeration thereof.

Aeration of the bed completes mobility or fluidizes most of the bed confined within the launder side walls so that stratification may take place. It will be noted from reference to Figs. 10 and 11 that the bed of materials is relatively thin at the feed end of each section or pocket and that it gradually increases in thickness as it approaches the point of refuse withdrawal. In order to maintain substantially the same degree of fluidity through the entire travel of the material, except for an immobile bed of refuse which accumulates adjacent each refuse withdrawal pocket, it is necessary to sectionalize the launder beneath the material supporting surface and control the flow of air (volume and pressure) to each section. We have provided air flow control devices generally indicated at H which give the operator complete control of the air currents and permits him to maintain the proper degree of mobility throughout the length of the bed to insure complete stratification of the kind above referred to.

Each section C, D and E is provided with refuse ejector mechanism positioned substantially adjacent the deepest portion of the pocket, within which forms an immobile bed of refuse, which mechanism is controllable for continuous or intermittent operation by mechanism generally indicated at J for withdrawing the refuse as it accumulates and thereby maintaining said immobile bed of refuse of a desired quantity. Adjacent each of said pockets 28, 29 and 30, there is also provided a plurality of longitudinally extending riffles 30a which extend across the refuse discharge openings 31, 31a and 31b. Short riffles 30b also extend rearwardly from the refuse discharge openings. These riffles 30a and 30b cause the refuse to become packed therebetween and increase the friction between the deck and the bed of immobile refuse and insure their movement in unison. They also prevent scouring out of the refuse by the mobile bed which moves thereacross. The long riffles 30a which extend both forwardly and rearwardly of refuse discharge openings 31, 31a and 31b have a height which fairly defines the height of the immobile refuse bed to be formed and aid in forming this bed. The short riffles 30b are provided to increase further the resistance between the bed of refuse and the deck adjacent the downstream side of the pockets 28, 29 and 30, and help confine the refuse to said pockets and prevent its passing into a subsequent section. The spacing of the riffles 30a and 30b is normally decreased in each succeeding pocket down the deck. That is, the riffles in pocket 30 are very closely spaced, those in pocket 29 less closely spaced and those in pocket 28 spaced the greatest amount. This takes care of the reduced density of the refuse in each of said pockets. That is, the refuse in pocket 28 will be the highest gravity, that in pocket 29 lesser gravity and that in pocket 30 the lowest gravity. The lower the gravity of the refuse, the greater the friction necessary to maintain immobility in the refuse bed. In some cases, where the material has a high coefficient of friction or the deck surface is very rough, the riffles may be omitted.

The main frame A not only supports the launder B for reciprocatory movement but carries the drive mechanism F, the air flow control device H and the ejector drive mechanism J.

The main frame A comprises the channels 1 and 1a, held together in spaced relation by end cross members 2, intermediate cross members 3 and the ejector drive support frames 3', to form a rectangular open frame. The frame A is pivotally supported at the feed end on a shaft 4 journaled in bearings 5 secured to a support 6 of sufficient height to permit the frame to carry the air flow control device H and the refuse drive mechanism J in proper spaced relation to the launder and above the floor. At the foot or discharge end, the main frame A is supported upon screw jacks 7, or other suitable devices, by means of which the slope or inclination of the main frame and launder may be adjusted.

The launder B is supported above the main frame A for reciprocatory movement in a plane, always parallel thereto on rollers 8, mounted in brackets 9 attached to the channels 1 and 1a, as illustrated in Fig. 1 or, as illustrated in Fig. 23, by rocker arms 105 pivotally connected as at 106 and 107 to brackets 108 and 109 which are secured to the main frame A and launder B, respectively. If the rocker arm support be employed, the arms should be set so that the vertical component of movement is at a minimum.

Drive mechanism F for the launder comprises a motor 10 mounted upon a motor base 11 of the slide rail type, which is rigidly connected to the frame A, and adjustable upon the slide rails by hand wheel 12, in a well-known manner. A V-belt drive mechanism comprising the drive pulley 13 (Fig. 3), fixed to the armature shaft 14 of the motor 10, is connected by a belt 15 to a driven pulley 16 keyed to the crank shaft 17, journaled in bearings 18, 18a and 18b, Fig. 2, attached to the channels 1 and 1a, through a supporting block 19a. Oscillation or reciprocation of the launder B by the power of the motor 10 is accomplished through the medium of a connecting rod 19 eccentrically journaled at 20 on the crank shaft 17 and at its opposite end pivotally connected as at 21 to the launder B.

Referring to Figs. 2, 16 and 17, it will be noted that adjustment of the drive pulley is accomplished by moving the motor 10 back and forth by handwheel 12, which correspondingly effects the tension of belt 15. Thus when the motor 10 is pulled to tension the belt 15, the belt crowds between the discs 22 and 23 of the drive pulley 13, disc 23 being movable on the pulley hub 24 relatively to the disc 22. Spring 25, positioned between the movable pulley disc 23 and nut 26 threaded, as indicated at 27, on the end of the hub 24, is thereby compressed, and returns, upon release of tension on the belt 15, to force the discs 22 and 23 together and to force the belt from the inner position of Fig. 17 to the outer position of Fig. 16. The compression spring 25 on the sliding disc 23 assures sufficient friction on the belt to transmit the rated load of the motor at all speeds. Nut 26 permits regulation of spring tension. The belt is driven faster when in the outer position of Fig. 16 than when in the inner position of Fig. 17, so that corresponding adjustment of the speed of the shaft 17 and, therefore, of the connecting rod 19 may be effected.

Referring particularly to Figs. 7, 8 and 9, it will be noted that the launder main frame comprises the side sills 33 and 34 joined together and held in spaced relation by end cross members, not shown, to make a rigid rectangular frame structure. Positioned between the side sills 33 and 34 and extending along the bottom edges thereof in spaced relation, is a plurality of assembled units L of air distribution chambers such as illustrated in Figs. 12 and 13. It will be noted from reference to Figs. 5, 6, 7, 8, 9, 10 and 11 that units L project below the bottom edge of the side sills 33 and 34 leaving a space at the top thereof.

Figure 14:
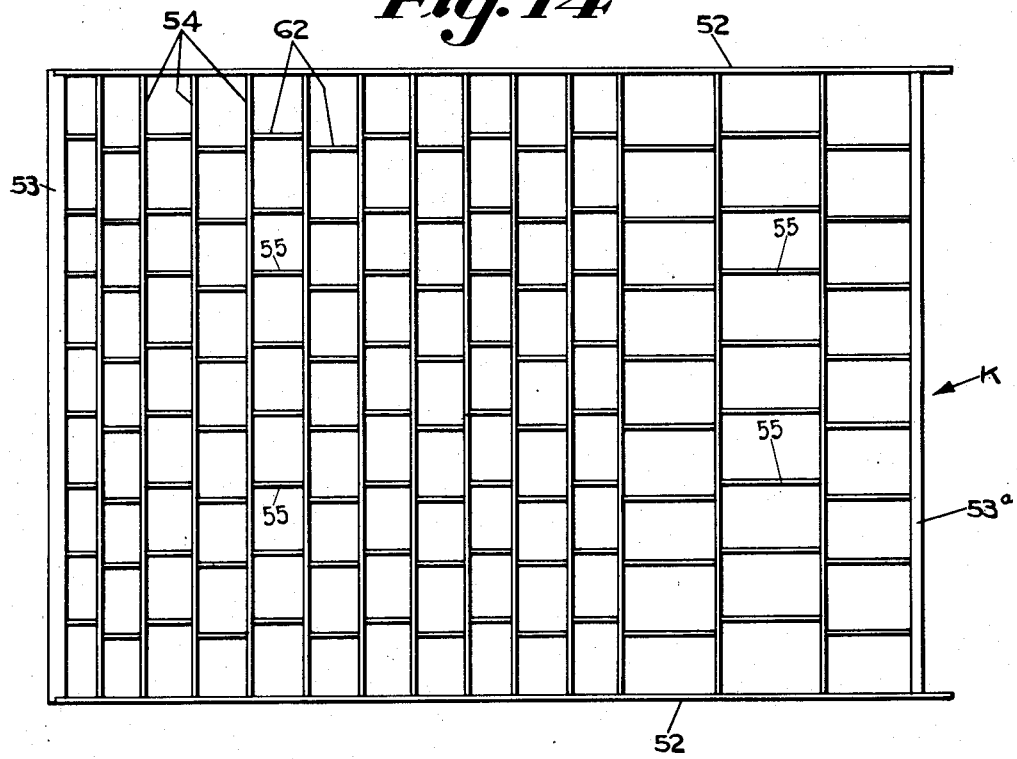
Fig. 14 is a plan view of the deck showing a preferred arrangement of the air distribution chambers.
Figure 15:
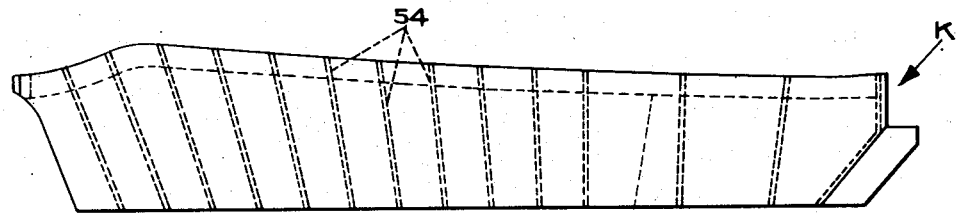
Fig. 15 is an elevation of the structure shown in Fig. 14.

Deck members K, such as illustrated in Figs. 14 and 15, are positioned above the units L, all of which are spaced longitudinally of the launder to provide openings 31, 31a and 31b, respectively, at adjacent ends in which are positioned refuse draw chutes. All of the above mentioned elements, units L, K and refuse chutes, are fastened to one another and to the side sills 33 and 34 to make the assembly rigid and substantial.

It will be noted that the upper surface of each of the deck units K has a contour which when in assembled relation forms the pockets 28, 29 and 30, respectively, each of which comprises the gradually sloping curved forward portion 10', the relatively deep portion 11' and the rearward upwardly curved portion 12'. This surface is covered by a perforated screen plate 57 having the proper percentage of open area to distribute the currents of air evenly over the entire surface. While not so illustrated in Figs. 6 and 9, it is to be understood that the plate 57 is perforated throughout its length and breadth.

We have described the effect of mechanical agitation upon a bed or burden of material; if a flat inclined surface is employed, the material will travel along said inclined surface en masse in the direction of inclination. However, in following the present process, it is necessary to collect and retard the materials forming the lower strata of the stratified bed of materials. For this reason, the depression or relatively deep portion 11' is formed. The curved portion 12' being of sufficient rise to retard the flow of the lower strata forms a bed with certain limits of vertical depth. The outlets, 31, 31a and 31b, from the bed to the refuse chutes, it will be noted, are positioned at or near the deepest portion of the bed or pocket and extend entirely across the launder.

We have found by employing empirical methods that mechanical agitation to transfer the maximum amount of energy and thereby to produce the greatest degree of mobility in the mobile bed due to said mechanical agitation is accomplished by movement of the launder at from 225 to 275 oscillations per minute and from ⅜ to ¾" stroke. To create fluidity of such degree that "free-settling", "hindered settling" or "super-hindered-settling" conditions are produced and maintained, certain volumes or velocities of air flow must be employed. The diagram illustrated in Fig. 21 shows relatively and graphically the velocities of air currents required to produce these various conditions, the example being for various diameters of particles up to 1" in size and for various desired separation gravities. It will be noted that under "super-hindered-settling" conditions much lower velocities are employed.

It will be noted from reference to Figs. 10 and 11 that the depth of the bed or burden is changing continuously throughout the entire length of travel of the material and tends in any given compartment to increase in the direction of travel. Due to the friction of the immobile bed of refuse, the depth of the mobile bed thereabove may, in some instances, tend to increase but this is not harmful. Generally, however, the mobile bed has a nearly uniform depth over its entire length of travel in any given compartment. The interstitial velocities through the upper strata of the bed must remain substantially constant for practically all depths of refuse bed. It is well known that in air operated apparatus an increased depth of bed requires higher upward velocities to maintain mobility throughout the entire depth of the bed. However, in our invention, this is not necessary, for the refuse bed accumulating adjacent the refuse draws is not maintained in a mobile condition.

The increase in depth of refuse bed increases the resistance to flow of air and will increase the interstitial velocities in the lower part of the bed due to its greater compactness and, since a single fan or blower element is usually employed to supply the entire volume of air, there must be provided air control devices in connection with each transverse section of the launder to provide increased pressure to maintain said volume constant. By empirical methods, we have found that for practical purposes, it is necessary to provide separate air distribution chambers for each ¼" to ⅜" change in depth of bed.

As was mentioned previously, the table is provided with a series of sections C, D and E providing pockets indicated at 28, 29 and 30, for the purpose of withdrawing successive strata of the bed. These pockets are provided, respectively, at substantially their deepest portions, with refuse discharge chute openings 31, 31a and 31b, each chute being preferably made of a casting having an offset 32, the purpose of which will be explained hereinafter. These chutes are affixed to the side sills 33, 34 of the table B, providing additional stiffening means and definitely spacing the pockets or sections. The chutes extend transversely entirely across the table.

Referring to Figs. 12 and 13, the units L comprise the longitudinal side plates 35, end plates 36 and 37, bottom plate 38, transverse plates 39 and longitudinal plates 40, all of which may be of steel or wood securely held together, or the unit may be of cast metal, such as aluminum, as conditions may dictate. Apertures 41 are provided in the bottom plate 38 for reception of the air diffusion elements 42, the side walls of which are perforated, as indicated at 43 (Fig. 5) for passage of air, the tops 44 being closed. Each of the air diffusion elements 42 is provided with a flange 44a which by means of bolts or the like may be securely fastened to the bottom plate 38, there being a packing 45 between the flange 44a and the bottom plate 38 to seal against air leakage. The open ended projections 46 of the air diffusion elements 42 are received in flexible hose connections 47a, the connection being sealed by cementing or the like, and connect with air supply pipes leading from manifolds 47. Each manifold is connected by pipes 48 to the main air supply chamber 50, there being provided valves 49 in the pipes 48 to control the flow of air to each transverse section of the launder. The flexible pipe connections 47a enable the launder to oscillate or reciprocate with respect to the stationary main supporting frame A. Additional air control valves 91 (Fig. 7) are positioned within each tube 47a at its point of connection with the manifold 47 so that flow of air to each portion of any transverse section may be controlled.

In Figs. 5 and 6, it will be noted that the end plates 36 and 37 are fixed to the chute walls with felt packing 51 between the points of contact.

The deck frame unit, generally indicated at K, is illustrated in Figs. 14 and 15 and comprises the side members 52, end cross members 53 and 53a, intermediate cross members 54, some of which are of greater height than others, and longitudinal members 55. All of these members are preferably made of hard wood for strength and lightness. The relative difference in height of the cross members may be modified to conform to the contour of the deck surface required. It will be noted that the longitudinal members 55 are staggered so that there will be no continuous paths longitudinally of the launder or in the direction of flow of material above which the bed might not be aerated.

In assembling the device, the units K are positioned between the side sills 33 and 34 above the air distribution units L with the transverse members 54 of the decks in alignment with the transverse member 39 of the air distribution units (Fig. 5). All abutting edges of these respective units K and L are sealed against air leakage with strip felt or other suitable packing 51a. The perforated deck plate 57 is securely fastened to the upper edges of the longitudinal and transverse members of the deck units L by means of small wood screws, closely spaced to prevent air leakage from one section to another. The longitudinal members 62 (Figs. 14 and 15) of the deck units L are provided to support the deck plate 57 between the members 54 and add to the strength of the deck frames.

It is also to be noted that the lower edges of members 62 are double beveled to reduce to a minimum their interference with the passage of air upwardly through the deck plate 57.

After the deck units are assembled in proper relation to the air distribution chamber units to form the sections C, D and E with the slotted openings 31, 31a and 31b, respectively, of the proper width, the trough plates 58 which are provided with longitudinally extending angles 59 may be clamped by means of bolts 60 to angles 61 extending along the top edge of the sills 33 and 34; this forces the abutting edges of the deck units K down onto the air distribution units L to compress the packing 57a, thereby effectively sealing all joints.

Each of the refuse discharge chutes with openings 31, 31a and 31b is provided with an offset portion 32 having a perforated bottom wall 89 in connection with one section of air distribution chamber. It will be noted that this provides for air flow through the bed of immobile refuse.

The refuse discharge chutes extend downwardly to the lower edge of the side sills 33 and 34, each providing a relatively long passage, which when the launder is in operation is filled with closely compacted refuse affording an effective seal against flow of air in a downward direction. Attached to laterally extending flanges of the chutes are cylindrical housings 63 within which are disposed rotary ejector elements 64 having a plurality of pockets or slots 65. Rotation of the ejectors 64 causes alternate filling and dumping of the pockets 65 which action provides control of the discharge of the refuse collected in portion 11' of sections C, D and E, and filling the respective chutes 31, 31a and 31b. The ejectors 64 are secured to pins 66 (Fig. 9) which extend through the sides of the table, the pins 66 rotating in bearings 67, rotation of the ejectors 64 being accomplished from a motor 68 mounted on a motor base 69 of a slide rail type, a belt 70 conveying power from a variable speed reducer 71 of standard type to a pulley or sprocket 72 keyed on one of the pins 66. Adjustment of the speed of rotation of the each ejector 64 is obtained by means of mechanism similar to that shown in Figs. 16 and 17. The drive pulley 73 on the armature shaft of the motor 68 corresponds to pulley 13 of Figs. 16 and 17; this pulley 73 comprises the discs 74 and 75 between which the belt 73a fits. Disc 74 is movable relative to disc 75. By manipulating the hand wheel 76, the motor 68 is adjusted back and forth so that when the motor is at the position nearest the driven pulley, the belt assumes the largest diameter formed by the cone-faced discs 74 and 75 and the maximum speed is obtained on the driven pulley. By turning the handwheel 76, the motor is moved away from the driven pulley. This causes the belt 73a to assume a smaller diameter between the cone-faced discs 74 and 75, the sliding disc 74 moving laterally, but held in contact with the belt by means of the compression spring 77. Thus, the speed of the driven pulley is reduced. When the motor is moved to the position farthest away from the shaft, the belt assumes the smallest diameter, and the minimum speed is obtained on the driven pulley. The adjustable variable speed devices are separately and independently operable, one being connected to each of the rotary ejectors 64, 65.

Each draw-off or ejector chute opens into a discharge chute 78 (Fig. 9) which chute 78 is of sufficient size to permit the oscillation of the draw-off chutes with the table. The fractions drawn off from the respective draw-off chutes are shown in Figs. 10 and 11 as being deposited on suitable conveyors, 79, 80 and 81, respectively, highest specific gravity refuse only being drawn off through chute having opening 31, refuse of intermediate specific gravity only being drawn off through chute having opening 31a, both of these fractions being shown as being deposited on the conveyor 79 for transportation directly to disposal. A mixture of coal and refuse of intermediate gravity ("bone") is withdrawn through chute having opening 31b and deposited on conveyor 80 for re-treatment on the table for completion of the separation. Clean coal only is discharged over the right-hand end of the table through a guide chute indicated at 82, onto the conveyor 81.

The material discharged through chute 78 onto conveyor 80 is transferred to the receiver 84 (Fig. 24) which empties into the hopper 83. The discharge from the hopper 83 to the air table or launder is controlled by the rotary valve 85. The conveyor 86 furishes the main supply of the material to be cleaned, there being a continuously uniform rate of feed of such material to the table or launder.

At the discharge end of the table, as shown in Fig. 4, the framework of the machine is supported on a jack 7 by adjustment of which the inclination of the table may be varied as desired. The jack 7 may be mounted on a suitable block 87.

The main air supply chamber 50 is connected to a suitable source of compressed air, not shown, such as a blower, centrifugal fan or compressor. Blow-off or safety valves 88 are provided preferably at the ends of the compressed air tank 50, to prevent excessive pressures from building up therein.

It will therefore be seen that the table is adapted to be reciprocated forwardly and backwardly by the drive mechanism F upon rollers 8 or rocker arms 105, with little or no vertical movement. Material to be treated is deposited in the hopper 83, as shown in Fig. 10, and fed therefrom by the feeder valve 85, which valve discharges the material onto the deck and is permitted to flow therealong, the trough plates 58 retaining the material in the bed on the table until such material is discharged over the right-hand end as clean coal. (See Fig. 2.)

As an example of how the process or method may be realized, let it be assumed that coal is the material being treated. Referring to the diagrammatic illustration seen in Fig. 22, which is purely illustrative and not restrictive, the material is submitted to the action of a dedusting element generally indicated as 96 (although as to certain coal this might not be necessary) having air inlet pipes 97 and 98 and air and dust outlet pipes 99. The coal is caused to pass in thin broken streams through the air currents, produced by a fan or blower not shown, of suitable velocity which will deflect particles of dust; for example, smaller than 48 mesh. The aspirate or larger particles of coal fall downwardly to the discharge spout at the bottom of the deduster 96 and into a hopper 100. From the hopper 100 the dedusted coal is fed onto a screen 101 having a screen surface 102 of proper mesh to make a classification of the products into two or more sizes; this depending upon the size range of the coal fed to the dedusting apparatus and the election of the size feed for subsequent treatment. From the classifying screen 101, the sized material is fed to the launders or air tables 103 and 104 (or any suitable number of like apparatus), by means of feed mechanism generally indicated at G (Fig. 10) and comprising a hopper 83 fed from a chute 84 at the discharge end of a conveying element 86. At the bottom of the hopper 83, there may be provided a valve mechanism of any type, here exemplified as a rotary valve feed 85 from where the material flows in a uniform stream as indicated at 90 onto the upper pervious surface of the launder deck.

It is to be understood that dedusting and size classification of the coal is not essential. The dedusting treatment does, however, remove the fine particles of material which would otherwise pollute the atmosphere of the plant and assists in flattening out moisture peaks often found in raw coal. Should the moisture content of the raw coal be high, hot air may be used in the dedusting apparatus which would, of course, reduce the moisture content of the aspirate.

Figs. 18, 19 and 20 show the composition of the bed at various points along section C of Fig. 10. The materials in the stream 90 (Fig. 10) being fed onto the table are, of course, promiscuously inter-mixed. Where the material is coal, there will be coal particles ranging from fine sizes to relatively coarse sizes, particles of "bone" or "bony coal" also ranging in size from fine sizes to relatively coarse sizes, and slate or other refuse also ranging from fines to coarse-sized particles. Of these, the coal particles are of the lightest specific gravity, the "bone" or "bony coal" of specific gravity higher than that of the pure coal, but less than the specific gravity of the slate and other "heavy" refuse associated with the coal. Therefore, the bed may be regarded generally as being made up of low gravity, intermediate gravity and high gravity components, each of which is in varying sizes from "fines" to "coarse" within the range of sizes being treated. In general, the heavy components form the smallest percentage of the mixture.

Now, with particular reference to Figs. 10 and 18, 19 and 20, it will be seen that the mixture strikes the deck of the table in a condition of promiscous intermingling of all particles and spreads out in a thin bed over the deck, where it is subjected to low velocity air streams, so that the bed, under the combined influence of the air and mechanical agitation imparted to the table by the drive mechanism F, becomes fluid-like in character, and flows by gravity along the deck at a rate dependent upon the inclination of the deck and the mobility of the bed of materials. The air velocity upwardly through the deck and bed is preferably just insufficient to support the finer refuse particles. The coarse particles of refuse will be distributed at the bottom of the bed, interspersed with coarse particles of intermediate gravity components, and even coarse particles of coal. A certain amount of fine particles of all components, with the possible exception of fine coal particles, will also be interspersed throughout the depth of bed, as there has been insufficient time for stratification to be accomplished. This condition is descriptively illustrated by Fig. 18.

As the material moves along the deck, the depth of bed gradually increases and the particles in the upper part of the bed flow more rapidly than the particles on the bottom. The high gravity, coarse particles come closer together, tending to force upwardly the intermediate gravity particles, because of the relatively lower specific gravities thereof. At first there will still be a certain number of coarse particles of intermediate specific gravities on the deck at the bottom of the bed and a certain number of fine heavy particles distributed throughout the depth of the bed although these are settling through the voids of the bed and are seeking the lowest level, it being borne in mind that the air currents in the voids are of velocities such that the smaller particles of refuse will settle to the bottom strata. This condition is illustrated by Fig. 19.

As the pocket 28 of section C of the deck is approached, the fine particles of highest gravity material have been pulled by gravity through the voids and stratify near the upper surface of the deck. Directly above the fine particles of high gravity-material are the larger particles of high gravity material and, if there is a deficiency of fine particles, some of the larger particles will be immediately adjacent the deck surface. None of the particles of low gravity material will be intermixed therewith due to the fact that they are stratified at the top of the bed by the air flowing upwardly therethrough. Any tendency for intermediate gravity particles to arrange themselves in the lower strata is removed entirely by the immobile bed of high gravity refuse adjacent the withdrawal pocket as hereinafter described.

At the deepest part of the pocket 28, where the discharge chute 31 (Fig. 10) is positioned, the depth of bed has reached its maximum and, due to the dished contour of the deck, there is formed at the bottom of this pocket a substantially immobile bed of accumulated high gravity refuse which, unlike the rest of the bed of material, is not fluid. This refuse is of all sizes, within the treated range, of the highest gravity material. This compact bed of high gravity material forms a compact mass of such density that it, in conjunction with the air streams flowing upwardly therethrough, prevents the entrance of any material of intermediate or low specific gravity, of any size, into the bottom of the pocket, and thus all intermediate and low specific gravity material will pass over into the next compartment or section as a part of the general mobile bed. The refuse withdrawal mechanism is operated at such a rate as to keep this immobile bed at a uniform depth, or in other words, after a desired depth of refuse bed is formed the refuse is withdrawn as fast as it accumulates. While this bed is described as immobile, it has a slight fluidity. The lateral spacing of the riffles 30a regulates the degree of this fluidity so that the refuse works toward the discharge chute 31 as fast as it accumulates.

As the depth of the refuse bed increases, the air pressure required to produce constant air volume thereby to maintain fluidity in the upper part of the bed adjacent the discharge chute 31 has necessarily been increased. To provide for this change in pressure is the function of the above described air valves and cellular deck structure. In addition, the increased density and close packing of the particles in the immobile refuse bed tend to decrease the voids in said bed with a consequent increase in air velocity therein. This jet action or increased interstitial air velocity will aid in removing any particles of intermediate gravity material that may have entered the immobile refuse bed. There is, however, no substantial increase in the velocity of the air streams at the top of the bed which is entirely mobile, and the streams become thoroughly dispersed and broken up through the lighter particles of the bed before the surface of the bed is reached. It will be seen, therefore, that an immobile bed of heavy gravity components has been built up at the discharge chute 31, ready to be withdrawn from the remainder of the material; this bed, because of the crowding action of the particles thereof, has crowded out the relatively lower specific gravity refuse particles and these, in turn, may support the bulk of the coal particles upon them, this condition being shown in Fig. 20. The intermediate gravity and coal particles flow over the immobile refuse bed in a mobile condition with the top of the immobile bed forming a rough supporting surface therefor, and this flowing material is still undergoing a stratifying action as it passes into the next section of the launder, the heavy particles being restrained adjacent to the chute 31 by the inclination of the pocket, the riffles 30a and 30b and the friction upon the particles, together, of course, with the fact that they are being withdrawn.

As the air velocities are insufficient to support even the smallest particles of highest gravity materials which tend to accumulate on the bottom of the deck, there will be formed in the pocket 28 the mentioned immobile bed of highest gravity particles of substantially all sizes of the range treated. The immobility of this bed of highest gravity refuse is caused by the aforementioned low fluid velocity in co-operation with mechanical agitation which are sufficient to maintain mobile the entire bed except where there is present this isolated formation of the highest gravity materials. The combined mechanical agitation and air velocity are just sufficiently less than is necessary to make mobile this highest gravity refuse and thus it forms into the pocket 28 in an immobile bed which is continuously being built up by stratified high gravity refuse. The top of this immobile bed forms an effective deck of refuse across which the lower and/or intermediate gravity particles are moved, in a mobile condition to the succeeding deck section or compartment in a partially stratified condition.

Attention is also directed to the specific contour of the deck and the method of imparting mechanical agitation thereto, and the regulation of such method, each of which constitutes an important element in the proper operation of our apparatus and the accomplishment of our method of "super-hindered-settling". With respect to the mode of imparting mechanical agitation to the deck and the means for providing this particular mode of operation, attention is directed to the fact that in the preferred embodiment of our invention, as illustrated in Fig. 1, the movement of the deck is substantially longitudinal to the direction of flow of the bed of materials undergoing stratification and is in a single plane. That is, the movement of the bed is entirely, or substantially entirely, without any component perpendicular to the general plane of the deck. This prevents the deck imparting any lifting or "kicking action" to the particles of material and tends to allow the immobile bed of refuse to become compact and to lie substantially motionless with respect to the deck. If desired, this plane of oscillation may be made parallel to the forward sloping part of each deck rather than parallel to the plane of the entire deck. In addition, another important feature is that the flow of the mobile bed is due substantially entirely to gravity, no mechanical means being employed to impart flow thereto. This also aids in obtaining a maximum condition of "super-hindered-settling".

With respect to the contour of the deck, it is to be first noted that it is entirely devoid of diagonal or lateral riffles and there is no lateral movement of either refuse or coal with respect to the deck, but only longitudinal movement thereof, except at a point of refuse withdrawal, which withdrawal is made from the bottom of a relatively immobile bed of refuse. In addition, particular attention is directed to the entire absence of any perpendicular abutments extending laterally of the deck. For example, the baffle or bottom wall 12', forming one bottom wall of the pocket 28 in which the immobile bed of refuse forms, does not rise perpendicularly from the bottom of the deck, nor at any angle even approaching a right angle. On the other hand, it is a gradual and smoothly rising curve. This is very important in forming the immobile bed of refuse for it prevents any "bumping" action between a wall of the deck and refuse particles which would tend to destroy stratification. In addition, the deck screen is gradually sloping at all positions, being entirely devoid of abrupt or sharp angles. Furthermore, the slope of the screen or deck plate 57 is small with respect to the plane of the deck and the plane of mechanical vibration thereof. This maintains the "kicking" action of the vibratory deck on the particles of material at a minimum.

In the second section (D) the above action is repeated, with the intermediate gravity particles replacing in the bed the particles of high gravity which were removed in the first pocket. The action in this case is substantially as in the first section C except that the immobile bed of refuse is of generally lower specific gravity material than before. In addition, due to the prior removal of most of the high specific gravity material, it is generally desirable to reduce the air velocity in the second section over that employed in the first section. A still further reduction of air velocity will preferably take place in the third section E and this may be carried on for any succeeding deck sections employed. The third section will be effective to remove any remaining high or intermediate gravity materials which were not removed by a preceding section. For the treatment of most coals found in practice, three sections will be sufficient to effect a substantially complete separation of clean coal and all the impurities found therein as raw coal. In some cases, even one or, at the most, two sections will suffice. It will be evident that the sections following the first section start with the material partially stratified because the material passing over the withdrawal pockets is in a stratified condition; thus, while the task of separation in the second and third compartments is more difficult due to smaller differences in densities of the particles, it is eased by the action of the prior section or sections, also by the withdrawal of the high gravity refuse, which permits of the use of lower upward currents, and hence of a more extreme "super-hindered-settling" condition.

Due to the employment of reduced air velocities in the three sections (C, D and E) it is also possible, as an alternate method of operation, to operate our method and device to treat a greater size range than normally possible. The air velocities in section C may be high enough to carry the smaller particles of refuse into the mobile bed and pass them over into the second section D, rather than withdrawing them as refuse in section C. However, due to the reduced air velocities in section D they will be withdrawn as refuse in this section. A similar action may take place in section D with respect to the fine particles of intermediate gravity material which will then be withdrawn as refuse in section E.

The following data are illustrative of typical conditions and results derived from actual runs in practice where coal with bone and shale refuse is the material treated and the desired specific gravity of separation is approximately 1.45-1.65:

| Size range of particles | Average thickness of bed on incline |
|---|---|
| | Inches |
| From ½ inch to ¼ inch | ⅝ |
| From ¼ inch to 6 mesh | ⅜ |
| From 6 mesh to 10 mesh | ¼ |
| From 10 mesh to 35 mesh | 3/16 |

| Size range of particles | Thickness of bed in refuse pocket including refuse and coal |
|---|---|
| | Inches |
| From ½ inch to ¼ inch | 3 |
| From ¼ inch to 6 mesh | 2 |
| From 6 mesh to 10 mesh | 2 |
| From 10 mesh to 35 mesh | 2 |

*Percentage of open area in deck sections*

| Size range of particles | Per cent open areas |
|---|---|
| From ½ inch to ¼ inch | 20 |
| From ¼ inch to 6 mesh | 10 |
| From 6 mesh to 10 mesh | 5 |
| From 10 mesh to 35 mesh | 3 |

*Minimum interstitial velocities of air in first compartment*

| Size range of particles | Velocity of air in feet per minute |
|---|---|
| From ½ inch to ¼ inch | 2,800 |
| From ¼ inch to 6 mesh | 1,200 |
| From 6 mesh to 10 mesh | 900 |
| From 10 mesh to 35 mesh | 240 |

*Air volume in cubic feet per minute per square foot of deck area in first compartment*

| Size range of particles | Air volume |
|---|---|
| | Cu. ft./min./sq. ft. |
| From ½ inch to ¼ inch | 440 |
| From ¼ inch to 6 mesh | 290 |
| From 6 mesh to 10 mesh | 180 |
| From 10 mesh to 35 mesh | 110 |

The inclination of the deck is varied from the minimum of ½ inch in vertical descent for each 12 inches of longitudinal length to 3 inch vertical descent for each 12 inches of length, for the maximum. In the example above given, the inclination should be 1¼ inch per foot.

The air distribution chamber is intended as at 92 for positioning of the rollers 8 and brackets 9, as will be seen from Fig. 8.

In order to remove all dust which may be ejected from the table, a hood 93 may be provided, a flexible bellows-like enclosure 94 connecting the hood 93 to the edges of the top of the table. The hood 93 is connected to a passage 95 through which the draft upwardly through the bed passes, carrying the dust particles therethrough.

Fig. 21 shows relative interstitial air velocities for conditions of "free-settling", "hindered-settling" and "super-hindered-settling", respectively, for particles of various diameters or sizes and various densities or specific gravities. Lines A—B represent the graphs for "free-settling" conditions, lines C—D for "hindered-settling" and lines E—F for "super-hindered-settling" conditions. It will be understood that these graphs are intended only to be relative, and the absolute values may vary between substantial limits. For purposes of illustration, however, the figure brings out in a clear manner the lower interstitial velocities employed for the conditions of "hindered-settling" and the still lower velocities for the "super-hindered-settling" conditions maintained in the present process.

To determine interstitial air velocity where a bed of materials of a relatively large size range and a range of specific gravities is in a "super-hindered-settling" condition, the size of the smallest particles forming the bed is first considered. As an illustrative example, let it be assumed that the smallest particles in the bed are 35 mesh particles. Let it be assumed further that a separation is at 2.0 specific gravity. That is, all particles having a specific gravity greater than 2.0 would be considered as refuse and all particles having a gravity less than 2.0 would be considered as coal. From the curves A—B, it is seen that the curve for a gravity of separation of 2.0 would be between the curves for 1.75 and 2.50 and thus this curve will be used to determine the interstitial velocity. As the size of the smallest particles is 35 mesh, the air velocity employed is that which corresponds to said smallest particles of 35 mesh. In other words, the interstitial velocity will be that just sufficient to maintain the smallest particles of material which have a density less than the gravity of separation in suspension under the conditions of "free-settling". In the example given, it will be approximately 420 feet per minute.

It is to be noted that at a velocity of 420 feet per minute the 35 mesh particle would be in suspension under "free-settling" conditions and that a 10 mesh particle would be in a condition of "super-hindered-settling". The interstitial air velocity employed might also be determined by considering the largest particle, 10 mesh, and referring to the curve E—F for "super-hindered-settling" conditions.

The curves or graphs of Fig. 21 are illustrative of a typical case where the deck surface is substantially that illustrated by the drawings, the launder is vibrated at a rate and with a stroke within the range above indicated, the material treated is coal with an average amount of bone and shale refuse and the table inclination is as above indicated. Any variation of any of these factors would influence the possible range to be treated.

Viewing the method of operation from a different standpoint, let us assume that an operator is presented with material to be treated by the launder indicated, of a given size range and gravity range. The operator will feed the material to the launder at a rate to produce a bed depth on the incline approximately as given by the above table. The air will then be regulated so that it, combined with mechanical agitation, will be just sufficient to maintain mobility throughout the deck except at the refuse withdrawal pockets where the bottom strata form an immobile mass. The further adjustment of the launder depends upon experiments to determine the lateral spacing of the riffles, the rate of withdrawal of the refuse, the tonnage that can be handled in one operation, and other factors known to those skilled in the art. Final adjustment will, of course, be determined from analysis of the products but in any case the air velocity employed should be as low as possible while mobility is maintained and this air velocity should never be greatly increased. The other variable conditions should be adjusted to this reduced air velocity.

It is, of course, evident that the smaller the size range the greater the capacity or tonnage may be. It is also evident that if there is a large difference in density between the clean product and the refuse a much larger size range and/or tonnage may be treated.

While the curves of Fig. 21 are general in their trend, they only apply specifically to the conditions above specified with respect thereto.

Attention is also directed to an important feature of our invention which is illustrated by the above table designated "Percentage of open area in deck sections".

The percentage of open area, of the deck, is relatively small, though the openings are spread over substantially the entire deck. The percentage of open area also varies with the size of the material to be treated and increases with the size of said material. It is very desirable to have a low percentage of open area for this provides a good distribution of the air throughout the bed of material, thus resulting in a uniform condition throughout the area of the bed. This open area is so chosen that the sub-deck pressures are commonly between 2" to 5" of water. This limit is by no means critical.

It is evident that by sectionalizing the deck and providing individual control valves 91 for each cell, the regulation of the air flow to each individual section may be individually controlled, which is one factor in controlling the stratification of the bed of materials. In addition, the mechanical agitation of the entire deck may be adjusted. By the combined effect of mechanical agitation, which is adjustable but general to the whole deck, and the control of air flow, which is adjustable individually for each cell or deck section, the conditions effecting stratification may be widely controlled for each deck section for which there is an individual cell.

The combined effects of upwardly moving air currents and mechanical agitation when properly employed with the apparatus above described, produce condition of "super-hindered-settling". This provides for efficient treatment of a relatively large size range of materials of close specific gravities with a definite separation of the particles according to specific gravities, and of a relatively large capacity; the refuse being withdrawn from the bottom of an immobile refuse bed, while the clean coal is continuously discharged over the end of the elongated deck. Provisions are also provided for a retreatment of the refuse withdrawn from the last deck section, where a plurality of sections are employed, as this refuse may contain some coal owing to variations in the quality of the raw coal.

Obviously those skilled in the art may make various changes in the details and arrangement of parts without departing from the spirit and scope of the invention as defined by the claims hereto appended, and we wish therefore not to be restricted to the precise construction herein disclosed.

Having thus described and shown an embodiment of our invention, what we desire to secure by Letters Patent of the United States is:

1. Apparatus for gravitationally fractionating materials which comprises a table along which a bed of the materials is adapted to travel in a single direction, the said table being of substantially uniform width and including side and end frame members, a unit defining cellular air distribution chambers positioned on the frame members, a unitary deck plate supporting member defining chambers adapted to register with the chambers of the air distribution unit, a perforated deck plate covering the deck supporting member and provided with a pocket of gradually increasing depth to a low spot and a less gradual decrease in depth therefrom through which pocket the materials travel, means for withdrawing refuse at said low spot, means for supplying fluid currents through the deck plate, and mechanism for horizontally reciprocating the table.

2. The method of treating raw coal containing foreign materials, ranging in size from relatively fine to relatively coarse particles, to effect a separation of the coal and foreign materials which comprises forming the raw coal in a bed, agitating said bed by mechanical agitation insufficient to make the bed mobile, supplying upwardly directed air current thereto in such quantity as to make the bed just mobile throughout its depth and to support only the fine particles of coal, accumulating the foreign materials in an immobile bed over which passes the mobile bed of coal, and withdrawing the foreign materials as fast as they accumulate after a predetermined bed thereof has formed.

3. Apparatus for stratifying and separating materials according to specific gravity comprising a table, a perforate deck on the table upon which a bed of material is adapted to form, means for supplying upwardly moving air currents through said bed, means for imparting vibrations to said table, a refuse withdrawal pocket on said deck having gradually sloping bottom walls leading to a discharge opening at the deepest portion thereof, and riffles in said pocket extending longitudinally of said deck.

4. Apparatus for stratifying and separating materials according to specific gravity comprising a table, a perforate deck on the table upon which a bed of material is adapted to form, means for supplying upwardly moving air currents through said bed, means for imparting vibrations to said table, a plurality of longitudinally spaced transversely extending refuse withdrawal pockets on said deck, and parallel riffles in each of said pockets, said riffles being more closely spaced as the distance of the pocket from the material receiving end of the deck increases.

5. Apparatus for separating refuse from coal comprising a stationary frame, a reciprocating deck carried on said frame, a pervious bottom on said deck, longitudinally spaced transversely extending refuse draws in the bottom of said deck dividing the deck into a plurality of sections, a source of air for said deck, means for individually controlling a flow of air through different areas of each section of the deck, said means including operating means whereby it is readily operable while the deck is in operation, the deck bottom being of irregular contour longitudinally to provide refuse pockets near the end of each deck section and above each refuse draw, the said contour being formed of continuous smooth curves which change in slope only gradually and are entirely devoid of transversely extending upright projections, thereby preventing recirculation of any portion of the bed of material thereon, and means for reciprocating said deck.

MACK E. HAWORTH.
BYRON M. BIRD.